United States Patent
Sans et al.

(10) Patent No.: US 11,888,684 B1
(45) Date of Patent: Jan. 30, 2024

(54) CONFIGURATION LAYERING (71) Applicant: Sage Global Services Limited, Newcastle Upon Tyne (GB)

(72) Inventors: Marc Albaladejo Sans, Barcelona (ES); Juan Antonio Benitez Sanchez, Barcelona (ES); Daryl Vaughan Britton, Newcastle Upon Tyne (GB)

(73) Assignee: Sage Global Services Limited, Newcastle Upon Tyne (GB)

( * ) Notice: Subject to any disclaimer, the term of this patent is extended or adjusted under 35 U.S.C. 154(b) by 0 days.

(21) Appl. No.: 17/721,306

(22) Filed: Apr. 14, 2022

(51) Int. Cl.
*G06F 8/71* (2018.01)
*H04L 41/0806* (2022.01)
*H04L 41/085* (2022.01)
*G06F 9/50* (2006.01)
*H04L 41/084* (2022.01)

(52) U.S. Cl.
CPC ........ *H04L 41/0806* (2013.01); *G06F 9/5072* (2013.01); *G06F 9/5077* (2013.01); *H04L 41/085* (2013.01); *H04L 41/0846* (2013.01)

(58) Field of Classification Search
CPC ............. H04L 41/0806; H04L 41/0846; H04L 41/085; G06F 9/5072; G06F 9/5077
See application file for complete search history.

(56) References Cited

U.S. PATENT DOCUMENTS

| | | | |
|---|---|---|---|
| 2008/0082959 A1* | 4/2008 | Fowler | G06F 9/44505 717/104 |
| 2015/0268881 A1* | 9/2015 | Nielsen | G06F 3/065 711/114 |
| 2017/0279678 A1* | 9/2017 | Kleynhans | H04L 41/0816 |
| 2018/0189121 A1* | 7/2018 | Jobi | G06F 9/455 |
| 2020/0192875 A1* | 6/2020 | Rudolf | G06F 16/1734 |
| 2021/0173670 A1* | 6/2021 | Borra | G06F 11/3466 |
| 2021/0234749 A1* | 7/2021 | Vazirani | H04L 67/34 |

* cited by examiner

*Primary Examiner* — Christopher B Robinson
(74) *Attorney, Agent, or Firm* — Raubvogel Law Office (57) ABSTRACT

Various embodiments described herein offer improved functionality for configuring software applications so as to provide customers with a great deal of configuration flexibility, while reducing data redundancy and facilitating maintenance. Multiple configuration layers are provided, including system layer(s) and tenant-specific layer(s). System layer(s) specify configuration parameters for a group of tenants, and tenant-specific layer(s) can be used to override particular parameters as needed for individual tenants. In this manner, the system layer(s) act as a template upon which tenant-specific configuration layer(s) can be added.

21 Claims, 9 Drawing Sheets

CONFIGURATION LAYERING

TECHNICAL FIELD

The present document relates to techniques for storing configuration data for software applications.

BACKGROUND

Many widely-available software applications have very a large customer base, potentially including customers who have very different needs from one another. As such, software applications are often configurable, so as to address the multitude of individual requirements and preferences needed for the software to meet customers' needs. Configurations may include, for example, renaming of ledgers and charts of accounts, specifications of posting rules, report configurations, transaction types, and/or the like. In some cases, different geographic regions may have different requirements as to how a chart of accounts is configured, and even within a region, it may be useful to provide customers with configurability as to how their specific chart of accounts is to be tailored for their business.

In many cases, it is not feasible to provide a unique instance of each configurable element (such as a chart of accounts) to each individual customer. Such an approach would theoretically yield the flexibility needed to allow for each software installation to be configurable for its particular customer; however, providing a unique instance for each customer would require that, if any chance is made to a single field in the element, the change would have to be updated across potentially millions of instances. Such an effort would be prohibitively difficult and labor-intensive, and would also cause issues if access to the individual instances were not possible, for example if a database is blocked.

Because of these issues, existing techniques for enabling configurability in software applications are not generally able to provide the flexibility needed to allow for each software installation to be fully configurable for each particular customer.

SUMMARY

Various embodiments described herein offer improved functionality for configuring software applications so as to provide customers with a great deal of configuration flexibility, while reducing data redundancy and facilitating maintenance.

In particular, the described techniques offer configuration capabilities for products such as accounting software, to facilitate adaptation to different geographic locations, legislations, and/or business types. For example, accounting application configuration may be used to adapt and configure various features such as a chart of accounts, posting rules, stock rules, transaction types, and the like. In at least one embodiment, the described techniques facilitate configuration of a multi-tenant product, while avoiding the need to replicate configuration parameters across all tenants (customers), which would otherwise create a large amount of redundancy and would also pose a logistical challenge for coding and updating the configuration data.

In at least one embodiment, multiple configuration layers are provided, including system layer(s) and tenant-specific layer(s). System layer(s) specify configuration parameters for a group of tenants (wherein the group may correspond to a geographic region, legislation, business type, or the like), and tenant-specific layer(s) can be used to override particular parameters as needed for individual tenants. In this manner, the system layer(s) act as a template upon which tenant-specific configuration layer(s) can be added For example, an instance of each particular element (such as a chart of accounts (CoA)) can be provided for each tenant group. This instance acts as a template upon which configuration layers can be added. Metadata representing each instance of each element is saved in a database, wherein each instance corresponds to a particular tenant group.

To each individual tenant (customer), it may appear that the particular element (such as a CoA) is uniquely associated with that tenant, and they need not be aware that the instance they are using may be shared among other tenants within the geographic region. According to the techniques described herein, layering functionality is employed, wherein tenants are able to add their own accounts to the CoA, and/or amend accounts within the CoA, by creating an override. Changes made by an individual tenant to his or her specific CoA are stored as metadata within a specific layer associated with that individual tenant. Such changes can include, for example, particular accounts added by the tenants, a personalized name for a ledger account, and/or the like.

In this manner, a data structure is implemented wherein a global layer of the data represents a standard local CoA, and tenant-specific data is stored in layers over the global layer. In this manner, the global layer acts as a template on which tenant-specific data can be added. For any given tenant, one or more applicable global layers and one or more tenant layers are merged to provide a single unique configuration for that tenant. Such a technique provides the flexibility to allow tenants to configure their own CoAs (and other elements) as desired, without requiring a specific instance to be generated for each individual tenant.

The described techniques provide improved flexibility while also improving efficiency in maintaining and updating configurations across all instances. For example, using the techniques described herein, any updates to the CoA for a given geographic region can be put in effect for all tenants by simply updating the single shared instance once.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

The systems and methods set forth herein may be applied in many contexts in which it can be useful to configure software applications for different tenants (customers). In various embodiments, the techniques described herein can be implemented in cloud-based accounting software, for example, to configure such software for different companies and/or other entities. However, the described techniques can also be used in other contexts. For example, the described techniques can be applied when configuring any type of software for any purpose, and one skilled in the art will recognize that the described techniques can be used in many other situations as well. In addition, the particular hardware arrangements depicted and described herein are simplified examples for illustrative purposes.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein can be implemented using other architectures, such as for example a standalone computing device rather than a client/server architecture.

Further, the functions and/or method steps set forth herein may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, is an individual, company, business, organization, enterprise, entity, or the like, which may optionally include one or more individuals. In the context of the description herein, such individual, company, business, organization, enterprise, entity, or the like may also be referred to as an "entity", "customer", or "tenant". A "group" is any set of users, entities, customers, or tenants, which may correspond to a particular geographic region, legislation, company, business, business type, or the like. A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Figure 1:
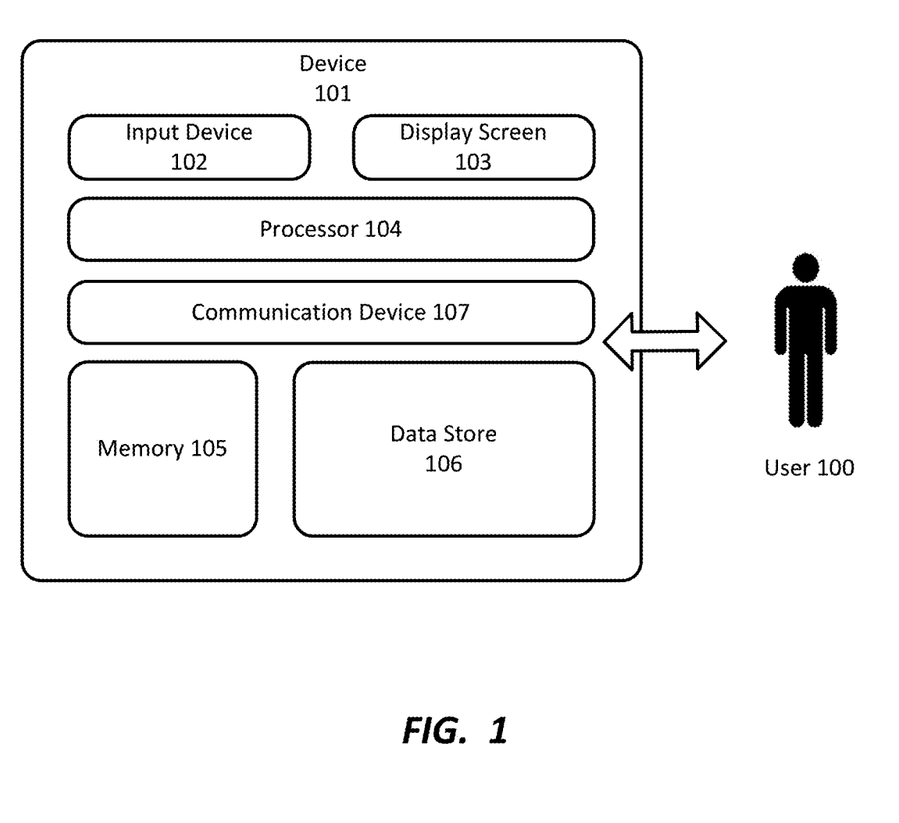
FIG. 1 is a block diagram depicting a hardware architecture for implementing the techniques described herein according to one embodiment.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data such as configuration templates that are used in configuring software applications for use by various entities. In addition, data store 106 may store data describing configuration layers to improve the efficiency of storing and managing configuration data, as described in more detail herein. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. Metadata associated with configuration data, and defining configuration templates and layers, can be stored in such databases using any suitable data format(s). In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for configuring a software application for a particular entity, and/or for managing such configuration as described herein. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
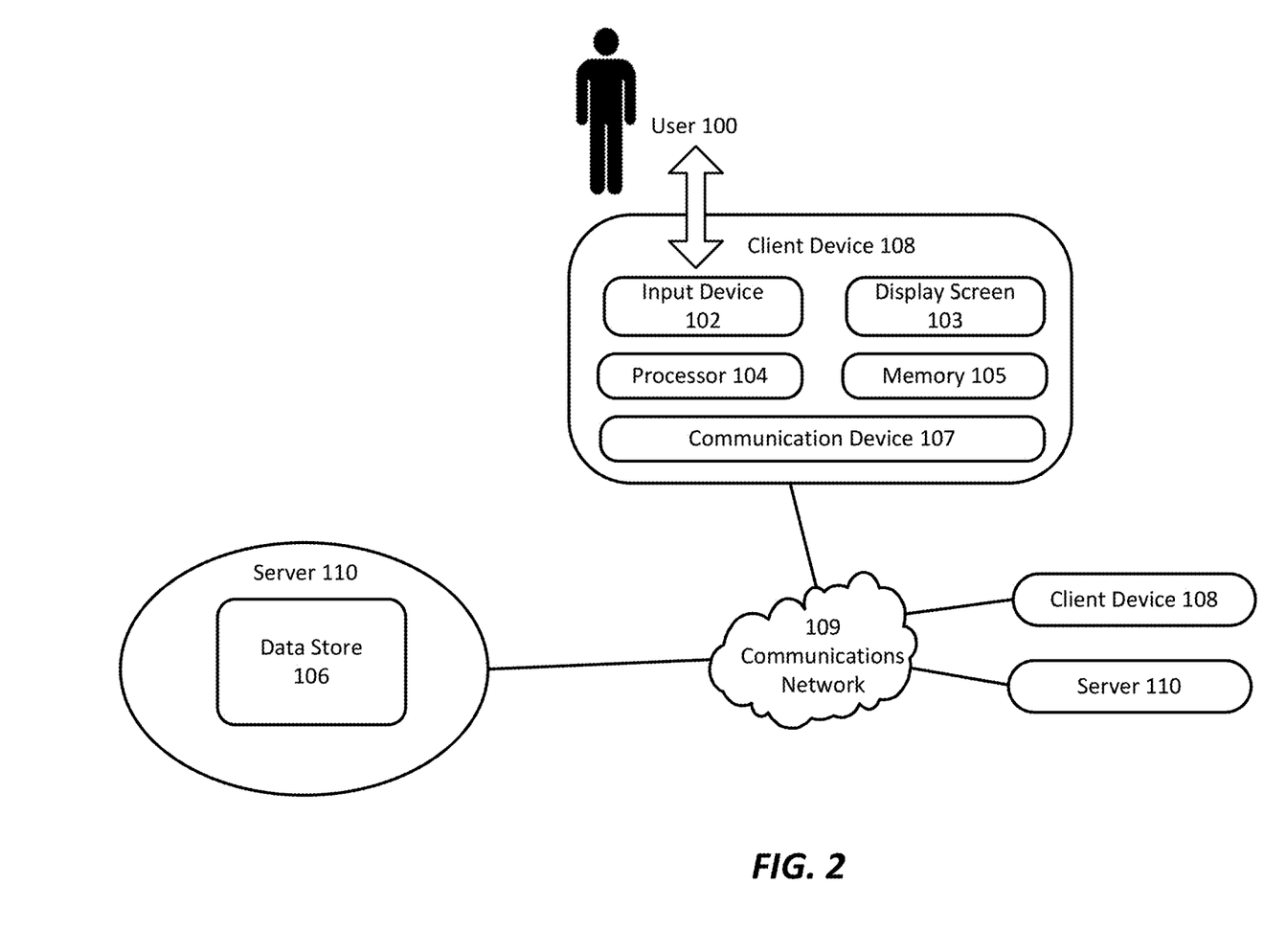
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store data such as configuration templates that are used in configuring software applications for use by various entities. In addition, data store 106 may store data describing configuration layers to improve the efficiency of storing and managing configuration data, as described in more detail herein; alternatively, such data can be stored elsewhere (such as at another server) and retrieved as needed.

In addition to or in the alternative to the foregoing, data may also be stored in a data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Configuration Templates

According to various embodiments, a configuration template including a number of layers is implemented for each of a number of groups of entities. Each group can correspond to a particular geographic region, legislation, company, business, business type, or the like. Each entity (or "tenant") can correspond to an individual, company, business, corporate entity, subdivision, or the like. Each configuration template includes any number of layers that facilitate deployment of configuration data across multiple tenants within a particular group. Common configuration data relevant to all tenants within a group can be provided in a layer that is separate from configuration data tailored to a specific tenant. In this way, management of common configuration data becomes much easier, since such data need only be stored and/or updated once for the entire group, and then automatically propagated to all tenants within the group. In addition, when an application programming interface (API) is used to interact with the system, configuration data from all layers may be aggregated (or merged) so that the API can function in the same manner as it would with conventional configuration data.

In various embodiments, any number of configuration templates can provided; they can be segmented/categorized according to any suitable organizational scheme, such as for example by geographic region, legislation, business type, feature, and/or the like. Configuration metadata can be stored in a database, and associated with configuration instances, to allow features and parameters to be adapted to different use cases, in particular when such use cases have some relationship to one another.

In at least one embodiment, each new feature in a given software application may be associated with configuration metadata that is stored in a database and retrieved when activating an instance of the software application so as to configure the application as desired and appropriate. A feature toggle can enable such functionality, activatable via an entitlement system.

For example, a particular company, or tenant, may have a preconfigured chart of accounts, and the tenant's license may enable a Stock Management feature. Based on the tenant's license, a particular set of ledger accounts may be made available, and the configuration of such accounts may be specified based on the particular license.

In at least one embodiment, various templates can be made available for different groups. For example, a set of templates can be provided for a particular geographic region or legislation, so as to allow a software application to be configured and adapted as appropriate and desired. In addition, individual software vendors and suppliers can each create their own configuration templates, for example to target specific vertical segments.

In at least one embodiment, configuration templates can be versioned and comparable with one another to identify changes. In addition, they can be validatable and testable. Versioning allows past processes to be repeated using a particular software configuration that was available at the time that a particular issue occurred. For example, if an invoice was generated in a previous year, versioning ensures that the system uses the chart of accounts, posting rules, and configuration that was available when the invoice was created. In this manner, in at least one embodiment, tools may be provided to enable authoring, testing, and deployment of configuration templates.

In at least one embodiment, configuration templates and layers are specified using metadata. Each layer is associated with a data structure that stores all metadata for a configuration object that may be delivered with a product. Individual entities can override metadata included in configuration templates using configuration controls provided by the software applications themselves. Entities can also create specific configuration metadata that meets their needs, using product APIs.

In at least one embodiment, entities can view their software configuration (for example as metadata) as a single data collection, in a unified view that includes all template information and relevant overrides. For example, if an endpoint is called to obtain a chart of accounts for a particular tenant, the system merges all layers to return a single list. In this manner, the underlying workings of the system, including layering, are transparent to the end user.

Figure 4:
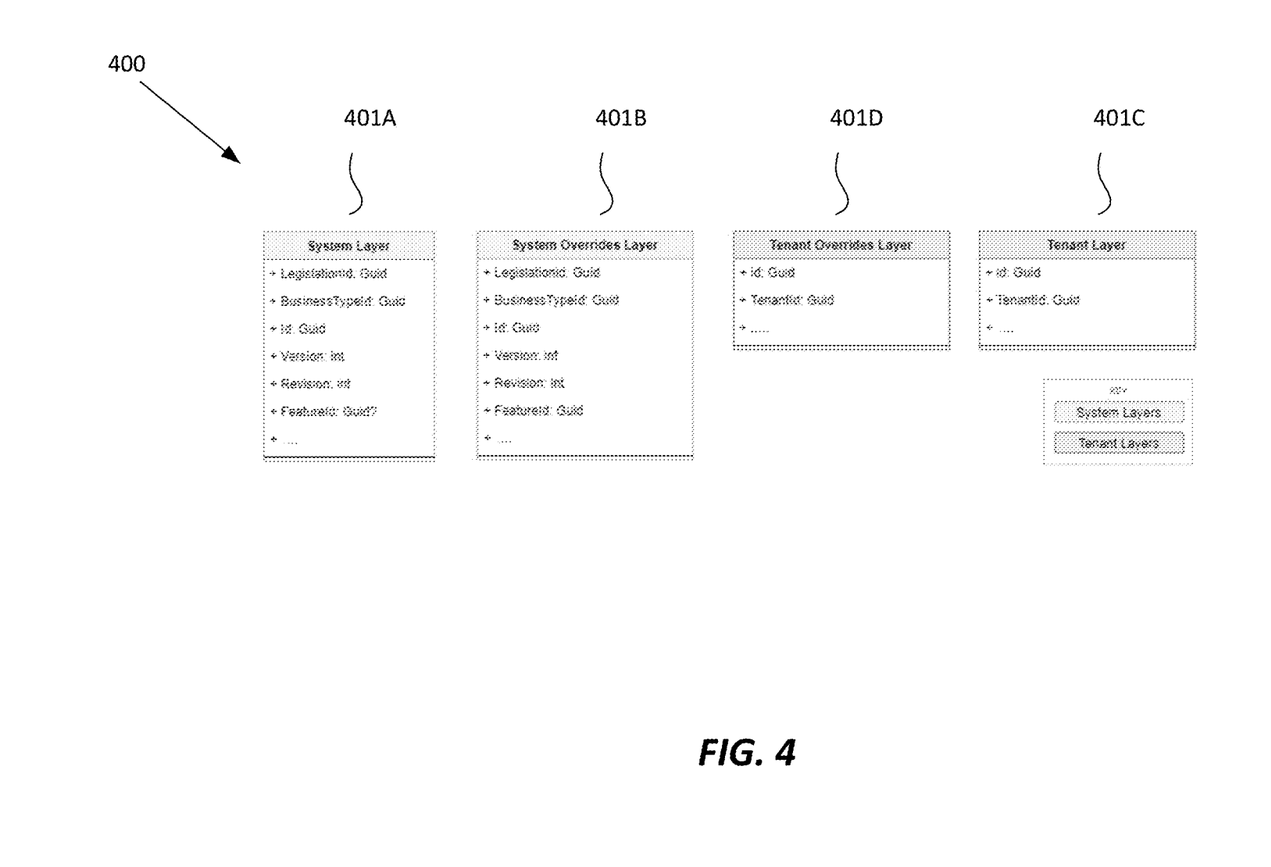
FIG. 4 is an example of a configuration template including four configuration layers, implemented according to one embodiment.

Referring now to FIG. 4, there is shown an example of a configuration template 400 including four layers 401A, 401B, 401C, 401D. The particular arrangement shown in FIG. 4 is merely exemplary; in practice, any number of layers 401 may be included, and one or more layers 401 may be omitted if irrelevant to a particular service. For example, in at least one embodiment, layers 401 may be associated with individual users 100, allowing for configuration at the individual user level within a tenant. Thus, specific report configurations, views, and/or other elements can be made available at the level of the individual user rather than for a tenant as a whole.

In at least one embodiment, a central repository of metadata can be automatically deployed to all services and/or databases, so that changes and new configurations can be deployed without any need to revise software code or to redeploy. The system thus allows such changes to be effected in real time.

In the example of FIG. 4, two of the layers 401A, 401B are system template layers, which may apply to multiple tenants within a group. System layer 401A includes configuration data that is common across all tenants and features, such as for example a chart of accounts. In at least one embodiment, system layer 401A stores all the metadata for a configuration object delivered with a product, including all system records (whether or not related to a specific system feature) for the configuration object. System overrides layer 401B is a feature override layer that acts as an extension to system layer 401A; specifically, system overrides layer 401B provides a way to implement overrides that are specific to a particular feature, but are common to all tenants within the group. In at least one embodiment, system overrides layer 401B stores metadata representing overrides for a specific product feature (for example, to override the name of a specific chart of accounts for a specific product feature). In at least one embodiment, system layer 401A and system overrides layer 401B are populated using a distributed mechanism to deploy metadata created by authors of the software across different domain services.

Layers 401C, 401D are tenant-specific, and contain information that is relevant for particular tenants. In the example of FIG. 4, layer 401C is a tenant layer that includes specific accounts for use only by a particular tenant. In at least one embodiment, tenant layer 401C stores custom tenant metadata, and in particular includes new elements that relate to the specific tenant and are not found in system layer 401A or system overrides layer 401B.

Layer 401D is a tenant overrides layer that can be used, for example, for updating a ledger name for a particular tenant. In at least one embodiment, tenant overrides layer 401D stores metadata overrides for a specific tenant feature, such as for example a name of a specific account in a chart of accounts for a specific tenant. Thus, layer 401D includes changes to existing accounts such as those appearing in system layer 401A or system overrides layer 401B.

In operation, tenant-specific layers such as 401C, 401D are provided for any individual tenants that have data, accounts, or other configuration information that is unique to that specific tenant. Any number of such tenant-specific layers 401C, 401D can be provided. In at least one embodiment, tenant-specific layers 401C, 401D are populated by user 100 via product APIs.

In at least one embodiment, the process of populating tenant-specific layers 401C, 401D is automated. For example, when user 100 uses the API to create a new ledger account, information for the account is stored in tenant-specific layers 401C, 401D. When user 100 uses the API to edit a ledger account associated with a particular tenant, the edit is automatically applied at tenant-specific layer 401C and/or 401D. Conversely, if the edit applies to an account associated with system layer 401A or system overrides layer 401B, the edit is applied by automatically generating and storing a record in system overrides layer 401B. User 100 need not be aware of which layer 401 contains the record reflecting his or her edit.

The architecture described herein allows each layer 401 to be configured and managed individually. Configuration data in system template layers 401A, 401B need only stored once, and can be managed or updated for all tenants with a single action. Such an approach improves efficiency, reduces resources required to store configuration information, and reduces redundancy and likelihood of error. The approach also makes it much easier to update data across multiple tenants within a group.

Figure 5:
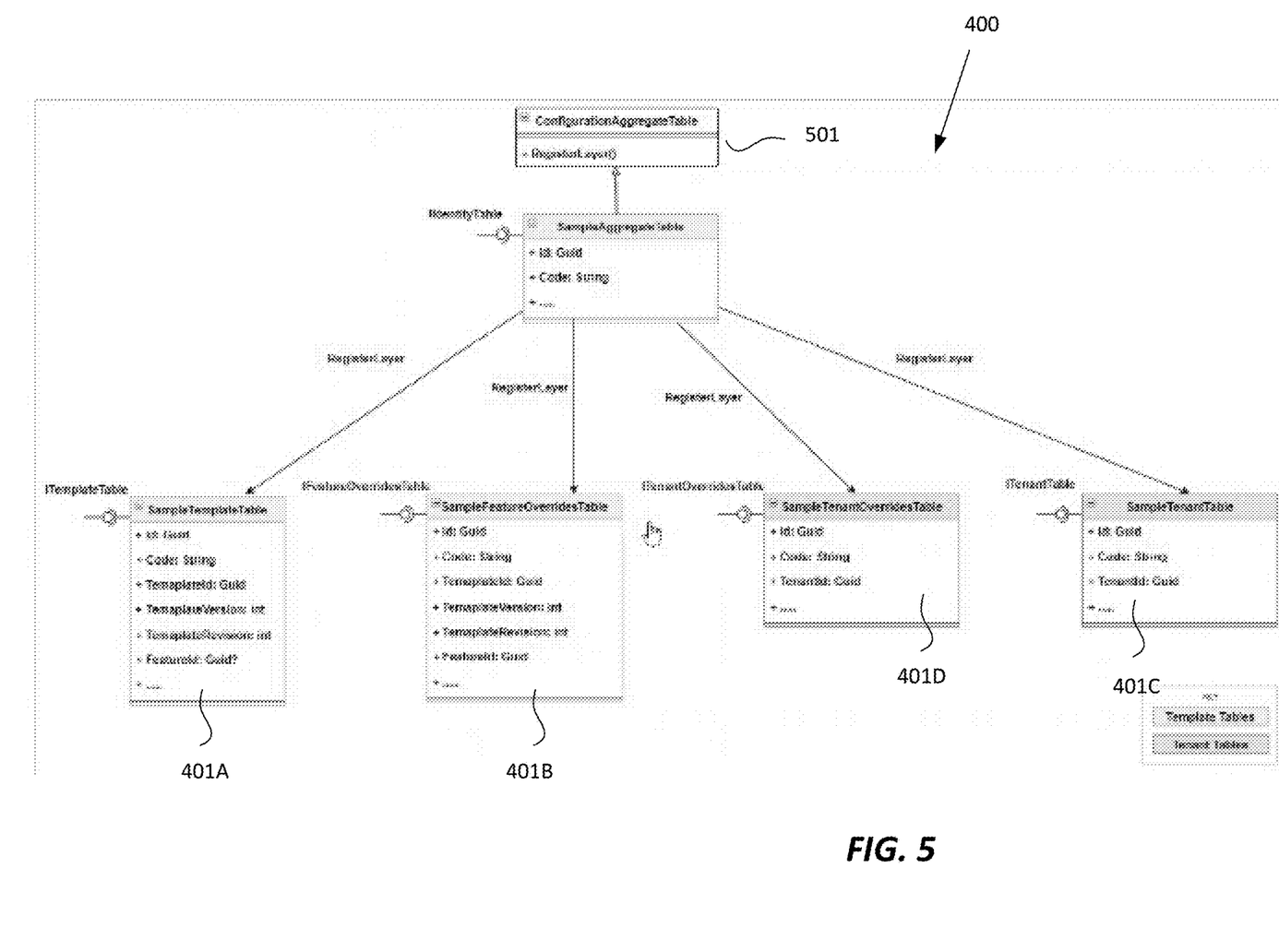
FIG. 5 is an example depicting aggregation of multiple configuration layers, according to one embodiment.

Referring now to FIG. 5, there is shown an example depicting aggregation of multiple configuration layers 401, according to one embodiment. In at least one embodiment, a software module aggregates data from various layers 401A, 401B, 401C, 401D, to generate an aggregated table 501. This aggregation process can include extracting data from each of layers 401A, 401B, 401C, 401D, allowing feature override layer 401B to override data from system template layer 401A, and also allowing tenant-specific layers 401C and 401D to override and/or supplement data from layers 401A and 401B. In at least one embodiment, system overrides and tenant overrides are automatically coalesced with system template layers 401A, 401B with tenant-specific layers such as 401C, 401D using a MySQL COALESCE function. The resultant aggregated table 501 can then be provided to any APIs that need to interact with the configuration data. In at least one embodiment, aggregate table 501 is an internal representation in the code base that contains all relevant layers, merged with one another. This allows developers to view aggregated (merged) data without having to know which layer 401 contains each individual data element.

In at least one embodiment, templates for configuration metadata are stored in YAML files, indexed by any suitable means, such as by geographic region, legislation, business types, and/or the like. The files containing the metadata are delivered to domain services using a distributed deployment process so as to make the metadata available to all deployed instances in use by any number of tenants, without the need for the software deployments to run complex operational process. One skilled in the art will recognize that any other type of files or formats can be used.

The techniques described herein provide several advantages over prior art methods. For example, by using configuration templates and layering, the described techniques allow configuration metadata to be adapted to specific tenant requirements without requiring storage of large amounts of redundant information. In this manner, the described techniques improve operation of the computing system itself, specifically by reducing bandwidth and storage requirements for storing and accessing configuration information for a large number of deployed software installations. In addition, configuration updates can be more efficiently managed across tenants and domain services.

In addition, the described system and method provide tenants with a unified view of configuration metadata via an API. Tenants can issue an SQL query (using a UNION operator) via the API to unify two or more sets of data (such as layers 401A, 401B, 401C, and/or 401D described above). Method Referring now to FIG. 3A, there is shown a flow diagram depicting a method for initializing configuration data according to one embodiment. In at least one embodiment, the method of FIG. 3A may be performed by software running on a hardware architecture such as that described in connection with FIGS. 1 and/or 2; however, one skilled in the art will recognize that the method of FIG. 3A may be performed using any suitable hardware architecture.

Figure 3A:
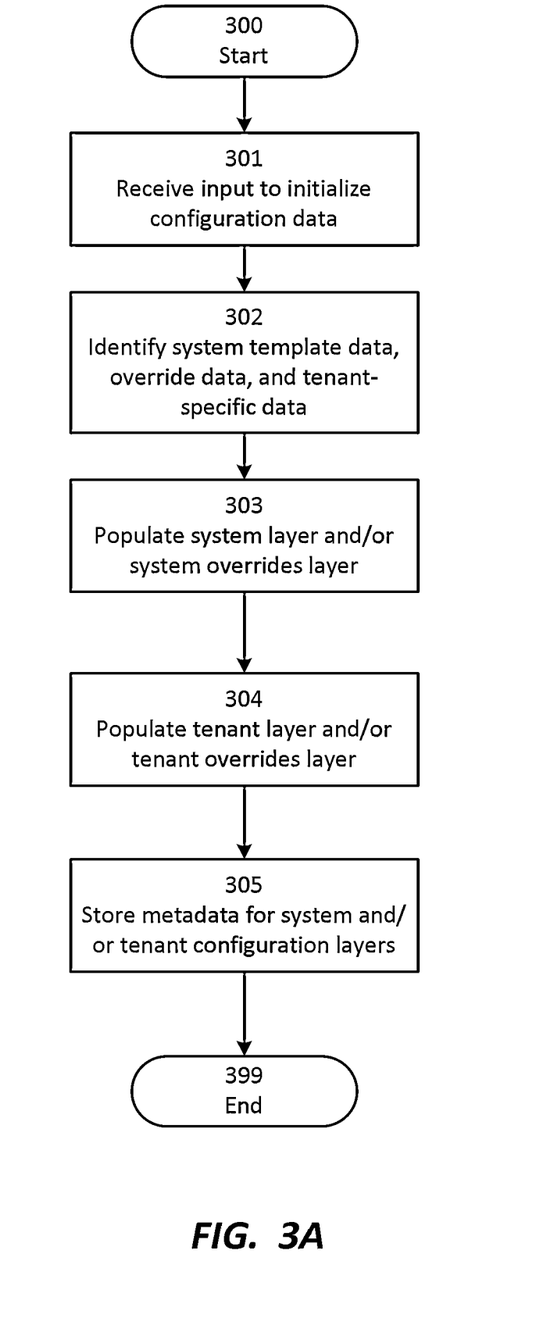
FIG. 3A is a flow diagram depicting a method for initializing configuration data according to one embodiment.

The method begins 300. The system receives 301 input to initialize configuration data, for example when initially installing a software application for use by a particular tenant. Such input may be provided via input device 102, for example, if user 100 is configuring the software application manually. Alternatively, such input may be based on an automated configuration of the software application, or on default configuration parameters.

Based on the received input, a determination is made to identify 302 which aspects of the configuration data are system template data, which are override data, and which are tenant-specific data. For example, system template data can be based on a default configuration for the software application, as may be used for all installations of the software. Tenant-specific data may represent data that is unique to the particular tenant. As described above, override data may apply to either system or tenant-level data, and may represent overrides to specific elements or aspects of the software. The determination made in step 302 may be performed manually, based on user input specifying whether the configuration data is system or tenant level, and whether it may represent override data; alternatively, the determination may be made automatically, based on the nature of the configuration data being applied, and/or user's 100 authorization level. For example, a given user 100 may have authorization to initialize tenant-level data, but not system data. In at least one embodiment, general users 100 can only update data in tenant layer 401C, and/or tenant overrides layer 401D; data in system template layer 401A and feature override layer 401B can only be updated by system administrators or others with high-level authorization.

Based on the determination made in step 302, the system proceeds to populate various layers 401. As described above, layers 401 may include, for example, system template layer 401A, feature override layer 401B, tenant layer 401C, and/or tenant overrides layer 401D; however, these specific layers 401 are merely exemplary. In steps 303 and 304, the various layers 401 are populated according to the input received in step 401. Metadata representing the configuration layers is then stored 305, for example in data store 106, either at device 101 or in a server 110 or other suitable storage location. The method then ends 399.

Once the configuration layers have been initialized as described in connection with FIG. 3A, installed software can query and receive configuration data as needed to run various features and functions. In at least one embodiment, installed software may perform such operations upon startup, or when a particular configuration element is needed to run a feature or function.

Figure 3B:
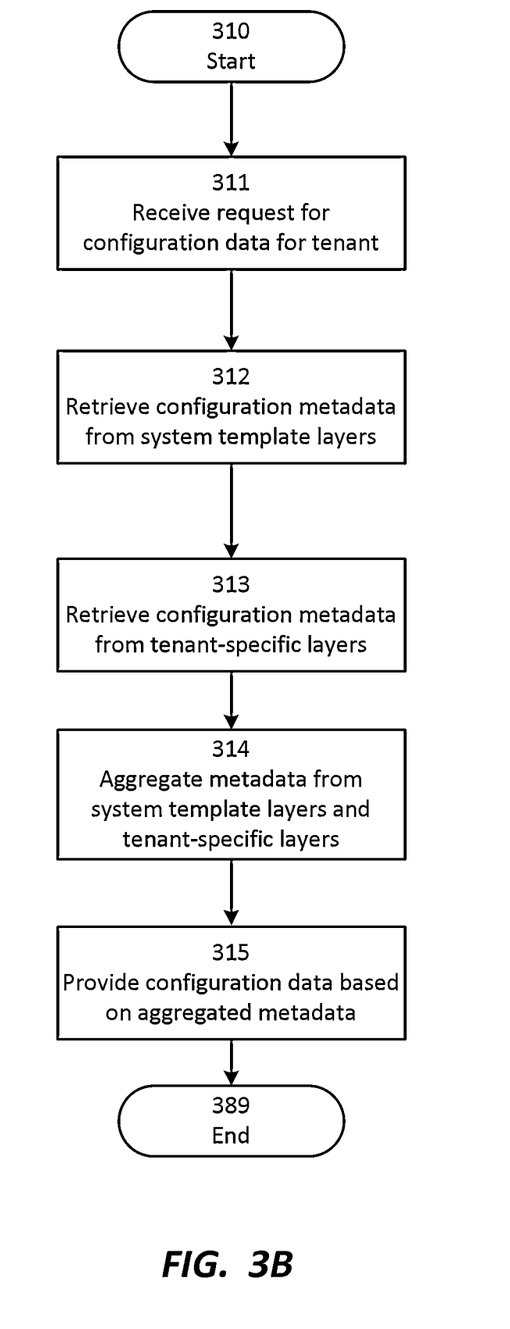
FIG. 3B is a flow diagram depicting a method for providing configuration data according to one embodiment.

Referring now to FIG. 3B, there is shown a flow diagram depicting a method for providing configuration data according to one embodiment. In at least one embodiment, the method of FIG. 3B may be performed by software running on a hardware architecture such as that described in connection with FIGS. 1 and/or 2; however, one skilled in the art will recognize that the method of FIG. 3B may be performed using any suitable hardware architecture.

The method begins 310. A request is received 311 for configuring software for a particular tenant. For example, an installation of a software application may issue a query via an API to obtain configuration data, such as for example the name of an account in a chart of accounts, or a limitation for a field, or a format for a date or address, or the like. Upon receiving the query, the system retrieves 312 configuration metadata from system template layers such as layers 401A, 401B, as well as additional configuration metadata from tenant-specific layers such as layers 401C, 401D for the particular tenant. The system then aggregates 314 the retrieved metadata, so that tenant data and applicable overrides are applied to the system data from system template layer 401A. The system the responds to the query by providing 315 the requested configuration data based on the aggregated metadata. In this manner, the software installation does not need to handle the aggregation of the various layers, as this functionality is handled by the back-end system; to the software installation, the process is as simple as issuing a query for configuration data and receiving applicable configuration data in response. The method then ends 389.

Figure 3C:
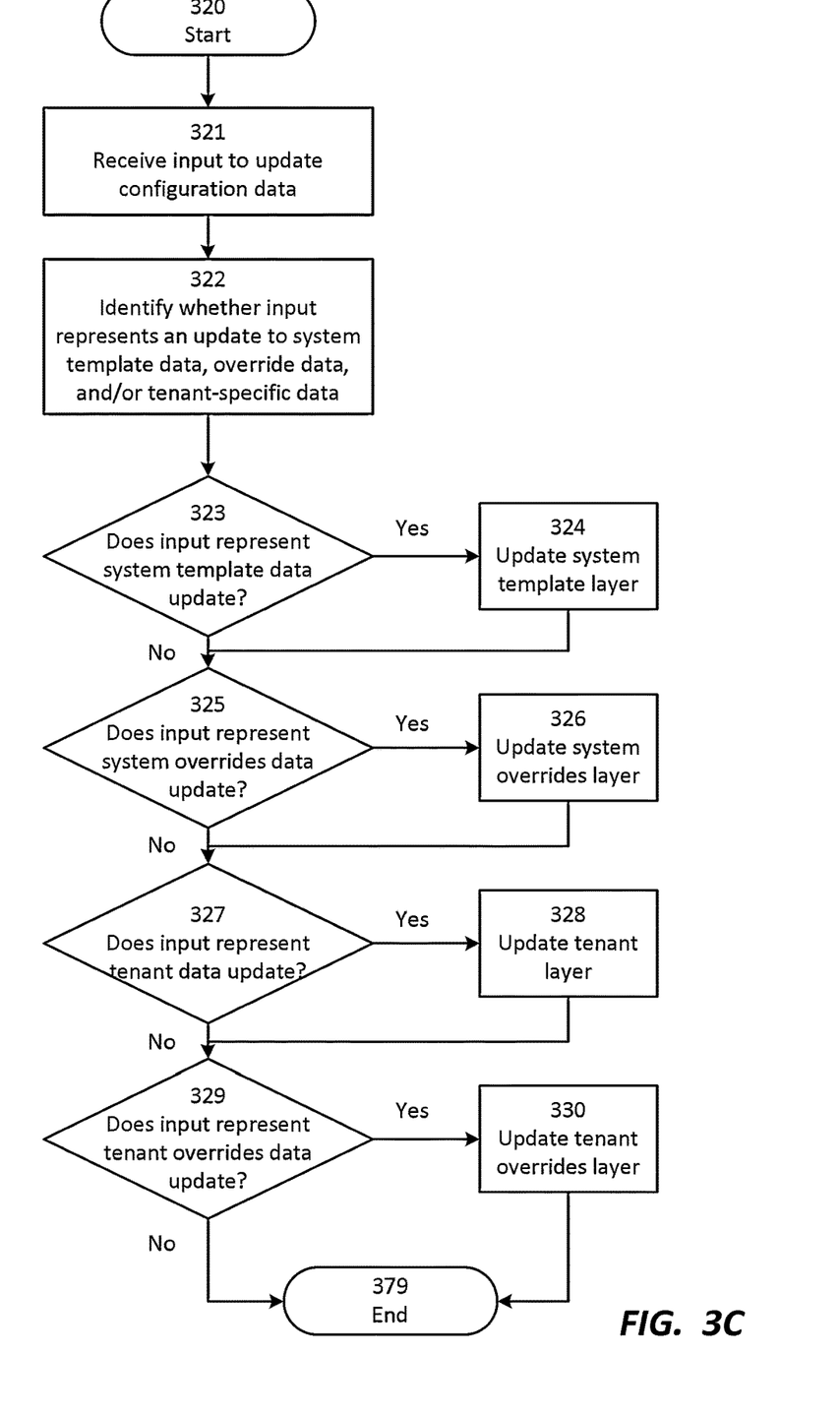
FIG. 3C is a flow diagram depicting a method for updating configuration data according to one embodiment.

Referring now to FIG. 3C, there is shown a flow diagram depicting a method for updating configuration data according to one embodiment. In at least one embodiment, when configuration data is updated, the system determines which layer of configuration data to update; such determination can be made based on the nature of the requested update, the authorization level of the user 100 requesting the update, and/or other factors.

In at least one embodiment, the method of FIG. 3C may be performed by software running on a hardware architecture such as that described in connection with FIGS. 1 and/or 2; however, one skilled in the art will recognize that the method of FIG. 3C may be performed using any suitable hardware architecture.

The method begins 320. The system receives 321 input to update previously stored configuration data. Such input may be provided via input device 102, for example, if user 100 is updating the software application manually. Alternatively, such input may be based on an automated configuration of the software application, for example based on a desired change in functionality, parameters, operating environment, management, and/or the like.

Based on the received input, a determination is made to identify 322 whether the update relates to system template data, override data, and/or tenant-specific data. For example, as described above, system template data can be based on a default configuration for the software application, as may be used for all installations of the software. Tenant-specific data may represent data that is unique to the particular tenant. As described above, override data may apply to either system or tenant-level data, and may represent overrides to specific elements or aspects of the software. The determination made in step 322 may be performed manually, based on user input specifying whether the update relates to is system or tenant level data, and whether it may represent override data; alternatively, the determination may be made automatically, based on the nature of the update, and/or user's 100 authorization level. For example, a given user 100 may have authorization to update tenant-level data, but not system data. In at least one embodiment, general users 100 can only update data in tenant layer 401C, and/or tenant overrides layer 401D; data in system template layer 401A and feature override layer 401B can only be updated by system administrators or others with high-level authorization.

In at least embodiment, when a user 100 makes a request to create, read, or update data, he or she need not specify a layer 401. Rather, layers 401 are transparent to users 100, and the system determines which layer 401 is to be updated in response to user's 100 request.

Based on the determination made in step 322, the system proceeds to populate various layers 401, as follows:

If, in step 323, the input represents a system template data update, the system updates 324 system template layer 401A.

If, in step 325, the input represents a system overrides data update, the system updates 326 system overrides layer 401B.

If, in step 327, the input represents a tenant data update, the system updates 328 system tenant layer 401C.

If, in step 329, the input represents a tenant overrides data update, the system updates 330 system tenant overrides layer 401D.

In at least one embodiment, steps 324, 326, 328, 330 are performed by update appropriate metadata in the corresponding layer 401. The method then ends 379.

Implementation

In at least one embodiment, the described system is implemented using a configuration subscriber package that provides base classes, interfaces, and helper components that provide consistency in the process of defining and querying aggregated configuration data. For example, each aggregate may include a Table object of type IConfigurationAggregateTable, which is used to register the various layers that can be used in generating aggregated configuration data. The Table objects of an aggregate implement API interfaces ITemplateTable, IFeatureOverrideTable, ITenantOverrideTable, and ITenantTable provided by the Configuration Subscriber.

In at least one embodiment, the configuration subscriber package also provides an extension of the SQLBuilder (ISqlBuilderExtensions) that helps to query or update a configuration object.

In at least one embodiment, each specific tenant is assigned to a template (TemplateId). System and feature data are populated in tables using capabilities provided by the configuration subscriber to automatically import the template data when a new template version or revision is published. Tenant override data is populated in the tables with the endpoints provided by the Domain Service (such as, for example, specific Patch tenant endpoints provided for each configuration object).

In at least one embodiment, Id is kept consistent between system, feature and tenant override layers. Id may be provided, for example, as an MD5Hash of the Code column.

In at least one embodiment, all data is classified by TemplateId (which may be, for example, an MD5 Hash of a business type code), Version and Revision.

In at least one embodiment, tenant and template middleware is provided that automatically assigns the TemplateId, Version and Revision to the context (TemplateDetails object). The context data is used by the SQLbuilder extension to filter the query to obtain the configuration data.

In at least one embodiment, layer metadata includes a header (X-SBC-Template-Version) that specifies the template version. In at least one embodiment, if no version is specified, the system defaults to the latest version and revisions.

In at least one embodiment, as described above, tenant layer 401C stores custom tenant data for a configuration object. Id is a MD5Hash of the Code column. Tenant data is populated in the tables, using endpoints provided by the domain service (which may be specific Post tenant endpoints provided per configuration object).

In at least one embodiment, the SQLbuilder extension is included in the configuration subscriber package, and provides a FromAggregate method that responds to a query of configuration object using a SQL UNION operation to aggregate, or merge configuration layer(s) and tenant-specific layer(s). The first part of the UNION queries the system and override layers using a LEFT JOIN query, where the system layer is the left side. A COALESCE function is applied to the columns to return the value with the highest priority, wherein tenant override layers 401D has the highest priority. The second part of the UNION queries tenant layer 401C.

The result is returned as an SQLbuilder query that can be used to add additional builder clauses; for example, a where clause can be used to filter the configuration object data). In at least one embodiment, this filter is applied in-memory.

In at least one embodiment, the SQLbuilder extension provides additional capabilities such as:
 allowing filtering of the data when it is retrieved; and
 allowing application of a where clause to the tenant layer to filter tenant data retrieved in the query.

In at least one embodiment, these capabilities are used to filter the data result set returned by the overall configuration query.

In at least one embodiment, a query performance analysis is done for each Unified Communication (UC) to ensure indexes are used and query performance is acceptable with the data volumes required for the UC in production.

In at least one embodiment, a SQLBuilderAggregateOptions helper class facilitates configuration of a builder extension to adapt it to specific UC needs.

Application Programming Interface (API)

As discussed above, in at least one embodiment, an application programming interface (API) is used to interact with the system. For example, user 100 may request a ledger account for a specified tenant via an API formatted as follows:

Get/v1/tenant/{tenanted}/ledger-accounts/{LedgerAccountId}

Figure 6A:
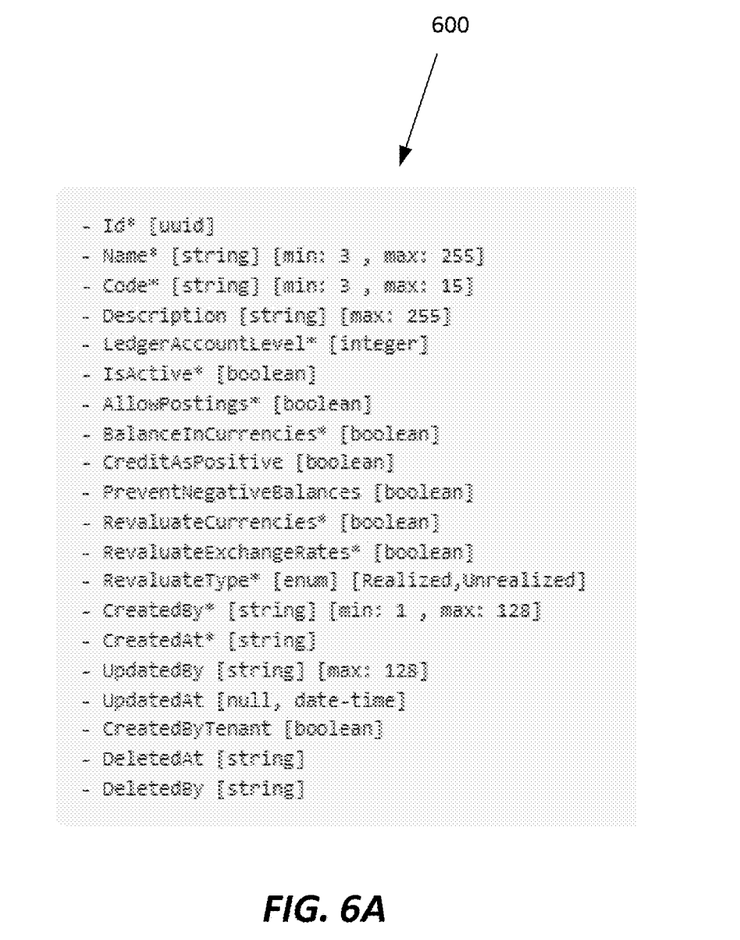
FIG. 6A is an example of a list of fields for the body of an application programming interface (API) request for retrieving a ledger account of a specified tenant, according to one embodiment.

Referring now to FIG. 6A, there is shown an example of a list of fields 600 for the body of an API request for retrieving a ledger account of a specified tenant, according to one embodiment.

Figure 6B:
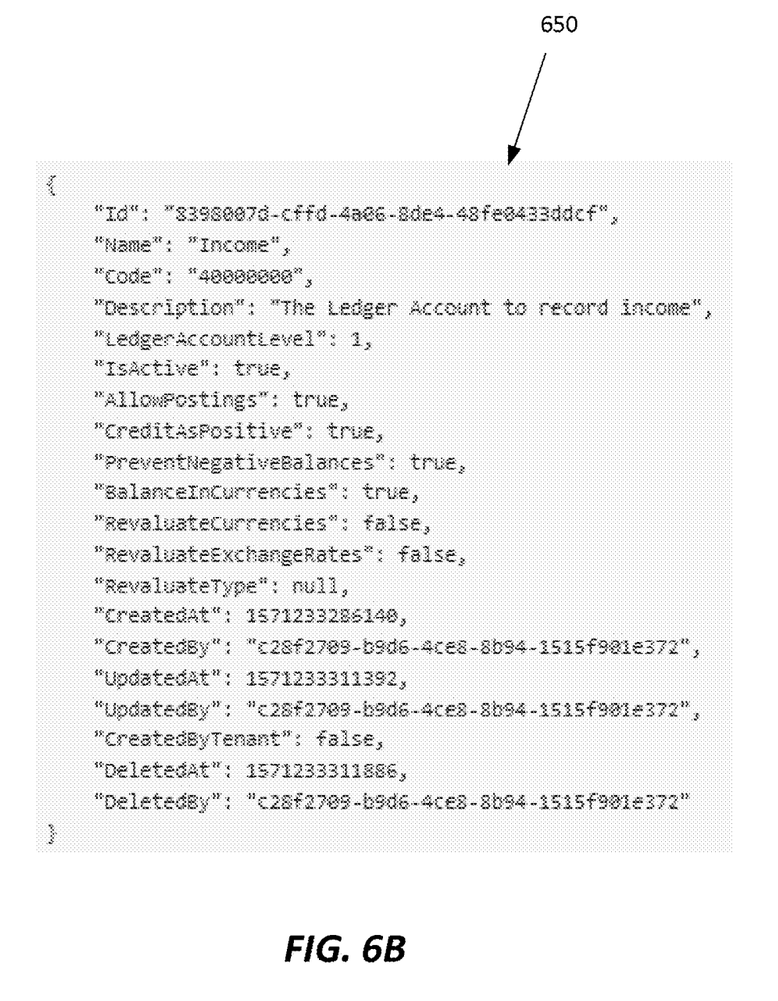
FIG. 6B is an example of a populated request according to the API of FIG. 6A, according to one embodiment.

Referring now to FIG. 6B, there is shown an example of a populated request 650 according to the API of FIG. 6A, according to one embodiment.

One skilled in the art will recognize that the particular fields, sequence, and layout depicted in FIGS. 6A and 6B are exemplary, and that the API can take on other forms and formats.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for configuring a software application, comprising:
   at a hardware processing device, automatically populating a first configuration layer, the first configuration layer specifying software application configuration parameters for a group of tenants;
   at the hardware processing device, automatically populating a second configuration layer, the second configuration layer specifying software application configuration parameters for at least one specific tenant, wherein:
      at least one element of the second configuration layer overrides at least one element of the first configuration layer without modifying the first configuration layer; and
      at least one element of the first configuration layer is not overridden by the second configuration layer;
   at an electronic storage device, storing metadata representing the first and second software application configuration layers;
   receiving a request for configuration data for configuring the software application in a custom manner for a particular tenant; and
   responsive to the request:

at the hardware processing device, retrieving stored software application configuration metadata corresponding to the first configuration layer for the group of tenants including the particular tenant;

at the hardware processing device, retrieving stored software application configuration metadata corresponding to the second configuration layer for the particular tenant;

at the hardware processing device, aggregating the retrieved software application configuration metadata corresponding to the first configuration layer and the software application configuration metadata corresponding to the second configuration layer, to generate a software application configuration for configuring the software application in a custom manner for the particular tenant, wherein the generated software configuration comprises at least one configuration parameter derived from the first configuration layer and at least one configuration parameter derived from the second configuration layer; and responding to the request by returning the aggregated configuration metadata specifying the software application configuration for configuring the software application for the particular tenant.

2. The method of claim 1, wherein aggregating the retrieved software application configuration metadata corresponding to the first configuration layer and the software application configuration metadata corresponding to the second configuration layer comprises overriding at least one element of the first configuration layer with at least one element of the second configuration layer.

3. The method of claim 1, wherein receiving the request for configuration data for configuring the software application in a custom manner for the particular tenant comprises receiving the request via an API.

4. The method of claim 1, wherein returning the aggregated configuration metadata comprises providing the metadata to a configuration module of the software application.

5. The method of claim 1, wherein returning the aggregated configuration metadata comprises outputting the aggregated configuration at an output device.

6. The method of claim 1, wherein returning the aggregated configuration metadata comprises outputting a unified view comprising elements from the first configuration layer and relevant overrides from the second configuration layer.

7. The method of claim 1, wherein at least one of the configuration parameters specifies a chart of accounts.

8. A non-transitory computer-readable medium for configuring a software application, comprising instructions stored thereon, that when performed by a hardware processor, perform the steps of:

automatically populating a first configuration layer, the first configuration layer specifying software application configuration parameters for a group of tenants;

automatically populating a second configuration layer, the second configuration layer specifying software application configuration parameters for at least one specific tenant, wherein:

at least one element of the second configuration layer overrides at least one element of the first configuration layer without modifying the first configuration layer;

at least one element of the first configuration layer is not overridden by the second configuration layer; and causing an electronic storage device to store metadata representing the first and second software application configuration layers; and responsive to receiving a request for configuration data for configuring the software application in a custom manner for a particular tenant:

retrieving stored software application configuration metadata corresponding to the first configuration layer for the group of tenants including the particular tenant;

retrieving stored software application configuration metadata corresponding to the second configuration layer for the particular tenant;

aggregating the retrieved software application configuration metadata corresponding to the first configuration layer and the software application configuration metadata corresponding to the second configuration layer, to generate a software application configuration for configuring the software application in a custom manner for the particular tenant, wherein the generated software configuration comprises at least one configuration parameter derived from the first configuration layer and at least one configuration parameter derived from the second configuration layer; and responding to the request by returning the aggregated configuration metadata specifying the software application configuration for configuring the software application for the particular tenant.

9. The non-transitory computer-readable medium of claim 8, wherein aggregating the retrieved software application configuration metadata corresponding to the first configuration layer and the software application configuration metadata corresponding to the second configuration layer comprises overriding at least one element of the first configuration layer with at least one element of the second configuration layer.

10. The non-transitory computer-readable medium of claim 8, wherein the request for configuration data for configuring the software application in a custom manner for the particular tenant is received via an API.

11. The non-transitory computer-readable medium of claim 8, wherein returning the aggregated configuration metadata comprises providing the metadata to a configuration module of the software application.

12. The non-transitory computer-readable medium of claim 8, wherein returning the aggregated configuration metadata comprises causing an output device to output the aggregated configuration.

13. The non-transitory computer-readable medium of claim 8, wherein returning the aggregated configuration metadata comprises outputting a unified view comprising elements from the first configuration layer and relevant overrides from the second configuration layer.

14. The non-transitory computer-readable medium of claim 8, wherein at least one of the configuration parameters specifies a chart of accounts.

15. A system for configuring a software application, comprising:

a hardware processing device, configured to:

automatically populate a first configuration layer, the first configuration layer specifying software application configuration parameters for a group of tenants;

automatically populate a second configuration layer, the second configuration layer specifying software application configuration parameters for at least one specific tenant, wherein:

at least one element of the second configuration layer overrides at least one element of the first configuration layer without modifying the first configuration layer; and at least one element of the first configuration layer is not overridden by the second configuration layer;

receive a request for configuration data for configuring the software application in a custom manner for a particular tenant; and responsive to the request:

retrieve stored software application configuration metadata corresponding to the first configuration layer for the group of tenants including the particular tenant;

retrieve stored software application configuration metadata corresponding to the second configuration layer for the particular tenant;

aggregate the retrieved software application configuration metadata corresponding to the first configuration layer and the software application configuration metadata corresponding to the second configuration layer, to generate a software application configuration for configuring the software application in a custom manner for the particular tenant, wherein the generated software configuration comprises at least one configuration parameter derived from the first configuration layer and at least one configuration parameter derived from the second configuration layer; and respond to the request by returning the aggregated configuration metadata specifying the software application configuration for configuring the software application for the particular tenant; and an electronic storage device, communicatively coupled to the hardware processing device, configured to store metadata representing the first and second software application configuration layers.

16. The system of claim 15, wherein aggregating the retrieved software application configuration metadata corresponding to the first configuration layer and the software application configuration metadata corresponding to the second configuration layer comprises overriding at least one element of the first configuration layer with at least one element of the second configuration layer.

17. The system of claim 15, wherein receiving the request for configuration data for configuring the software application in a custom manner for the particular tenant comprises receiving the request via an API.

18. The system of claim 15, wherein returning the aggregated configuration metadata comprises providing the metadata to a configuration module of the software application.

19. The system of claim 15, further comprising an output device, communicatively coupled to the hardware processing device, configured to output the aggregated configuration.

20. The system of claim 15, wherein returning the aggregated configuration metadata comprises outputting a unified view comprising elements from the first configuration layer and relevant overrides from the second configuration layer.

21. The system of claim 16, wherein at least one of the configuration parameters specifies a chart of accounts.

* * * * *